2,749,326
Patented June 5, 1956

2,749,326

PHENYL ETHYL SILOXANE COMPOSITION AND METHOD OF PREPARING SAME

Alfred Hirsch, Painesville, Ohio, assignor to Diamond Alkali Company, Cleveland, Ohio, a corporation of Delaware No Drawing. Application November 1, 1951, Serial No. 254,431

7 Claims. (Cl. 260—46.5)

This invention relates to a method of making materials comprising cohydrolyzates of phenyl and ethyl silicon trihalides having a transient thermoplastic range greater than partially condensed phenyl and ethyl silicon trihalide hydrolyzates or mixtures thereof, which method, instead of resulting in a deterioration of the valuable properties of phenyl silicon trihalide hydrolyzates, tends to improve the same. It also relates to moldable compositions incorporating such materials.

This application is a continuation-in-part of my copending application Ser. No. 31,409, filed June 5, 1948, now abandoned.

It has long been known in the art that phenyl siloxanes, i. e., condensed hydrolyzates of phenyl silicon trihalides, have superior heat and oxidation resistance and other properties desired for molded articles. However, there have been certain difficulties encountered in attempting to use the phenyl siloxanes in molded articles where advantage may be taken of their superior heat and oxidation resistance. These difficulties stem from the fact that these siloxanes possess a very short transient thermoplastic range. For example, when a phenyl silicon trihalide is hydrolyzed in water, there is produced momentarily a phenyl silicon triol, which in the presence of haloacid, begins to condense intermolecularly almost immediately. The extent to which this intermolecular condensation proceeds during the hydrolysis step is not entirely clear at the present time, although it is known that it is substantially impossible to isolate a phenyl silicon triol as such from the hydrolysis liquor or hydrolyzate solution.

Upon further treatment of the hydrolyzate solution by heating to remove the solvent therefrom, further water from the intermolecular condensation reaction is also given off. The intermolecular condensation of the phenyl silicon triol is thereby further advanced toward complete insolubility and infusibility. The removal of the last traces of solvent and free water, which may be accomplished either by high temperature heating or by chemical means, yields a hydrolyzate which, when isolated as a solid and ground to a powder, is found to have undergone the intermolecular condensation reaction to such an extent that upon attempting to form this powder into a molded article, the thermoplastic range of the hydrolyzate has been so shortened by the prior hydrolysis and heat treatments that there is very little, if any, flowability remaining in the material, with the result that the particles of the powder fail substantially completely to adhere to one another to form a continuous solid mass.

Hence, the prior art has faced the dilemma that in order to obtain a moldable product, the solvent must be completely removed but upon complete removal of the solvent, the hydrolyzate has so nearly approached infusibility as to render molding substantially impossible.

In order to modify the molding characteristics of the phenyl siloxane, prior art workers have resorted to cohydrolyzing a mixture of a phenyl silicon trihalide with a diphenyl silicon dihalide and a silicon tetrahalide, or with other mixtures of organo-silicon compounds, such as dimethyl silicon dihalide, and trimethyl silicon halide. The disubstituted organo-silicon halides in these compositions have a tendency to lengthen the thermoplastic range thereof to such an extent that the amount of heat required to advance these materials to the thermosetting stage renders their use in molding compositions uneconomical.

Another method in the prior art designed to modify the molding characteristics of the hydrolyzates of phenyl silicon trihalides comprises cohydrolyzing a mixture of a phenyl silicon trihalide with a disubstituted organo-silicon halide, isolating the hydrolyzate as a solid or semi-solid, and thereafter mixing the hydrolyzate thus obtained with a minor proportion of boric oxide. This method likewise has failed to produce a satisfactory siloxane molding powder.

Still another method heretofore proposed comprises reacting a mixture of a phenyl silicon trihalide and a disubstituted organo-silicon halide with a lower aliphatic alcohol in order to produce a mixture of organo-substituted silicate ester type compounds. The organo-silicate ester compounds must be hydrolyzed under very carefully controlled conditions in order not to advance the condensation reaction, hereinabove referred to, to an undesired extent. The solvent is removed from the mixture of the partially condensed cohydrolyzates, which is then isolated in solid form and comminuted in order to form the desired molding powder. The additional step of esterifying the organo-silicon halide compounds and the necessity of very carefully controlled conditions during the hydrolysis step have added an undesirable economic burden to this process.

It has also been proposed to obtain the very substantial advantage of the high heat resistance of the phenyl group in a siloxane to combine with phenyl silicon trichloride various types of other trichlorides, especially alkyl substituted trichlorides, to secure the benefit of heat resistance of the phenyl compound and the extension of the thermoplastic range which the added compound affords. In this connection, it has been proposed specifically to combine phenyl silicon trichloride with higher alkyl silicon trichlorides, such as dodecyl silicon trichloride, in various proportions and to cohydrolyze this combination. The materials of such combination, however, suffer from the excessively poor heat resistance of the added substance and thus possess a serious disadvantage not present in hydrolyzed and condensed phenyl silicon trichloride. In addition, general suggestions have been made in the prior art with respect to the combination of phenyl silicon trichloride and a wide but unspecified variety of aryl and alkyl silicon trichlorides and cohydrolysis of the mixtures obtained, but no teaching appears in the prior art of the compositions of the present invention nor of the specific advantage which obtains from using the same.

In contrast to the prior art methods, it has now been found that combining relatively minor amounts of ethyl silicon trihalide with a phenyl silicon trihalide and cohydrolyzing the organo-silicon halide mixture thus obtained, yields a partially condensed mixed cohydrolyzate which has a desirably extended transient thermoplastic range, i. e., the cohydrolyzate has a transient thermoplastic range greater than phenyl and ethyl silicon trihalide hydrolyzates or mixtures thereof. In the subsequent description and appended claims, the phrase "extended transient thermoplastic range" means that the transient thermoplastic range of the material concerned is appreciably greater than that of phenyl and ethyl silicon trihalide hydrolyzates or mixtures thereof. Accordingly, advantage may be taken of this fact in preparing a siloxane molding powder or moldable compositions in which it is desired to obtain a high degree of heat and oxidation resistance and from which molded articles may be obtained, which articles possess commercially satisfactory physical properties.

The degree of heat resistance of "cured" (substantially completely condensed) cohydroylzates of phenyl silicon trihalides and ethyl silicon trihalides is superior to that of either component of the cohydrolyzate alone. The improved heat resistance of the combination, while not presently completely understood, is apparently the result of a synergistic effect since, although the "cured" phenyl siloxane alone exhibits a high degree of heat resistance at temperatures of the order of 400° C., ethyl siloxane undergoes substantial decomposition at these temperatures. Nevertheless, the "cured" cohydrolyzate of a phenyl silicon trihalide and an ethyl silicon trihalide combined in the proportions taught herein exhibits an even greater degree of heat resistance than the phenyl compound alone. Thus, the heat resistance obtained in the case of the "cured" cohydrolyzate definitely is not the additive effect of the two components thereof. Furthermore, it has been observed, where partially condensed hydrolyzates of phenyl silicon halides and ethyl silicon halides are obtained separately, and the hydrolyzates then thoroughly mixed and "cured," that the "cured" mixture of hydrolyzates thus obtained exhibits a degree of stability, at temperatures of the order of 400° C., which is merely that to be expected from the stabilities of the separate components, i. e., the result obtained by this procedure is substantially the result of additive effects of the components.

A further synergistic effect is observable by a comparison of the transient thermoplastic range of a partially condensed cohydrolyzate of a mixture of a phenyl silicon trihalide and ethyl silicon trihalide with that of a mixture of the partially condensed hydrolyzates of a phenyl silicon trihalide and of an ethyl silicon trihalide. The partially condensed cohydrolyzate of the mixture of phenyl and ethyl silicon trihalides "cures" at a much slower rate than the mixture of partially condensed hydrolyzates, the "curing" of the cohydrolyzate requiring three to eight times as long as the mixture of hydrolyzates. This reduction in speed of "cure" is the limited extension of the transient thermoplastic range, which is one of the principal objects of this invention.

According to the present invention, a moldable, resinous, mono-organo-substituted siloxane of high heat resistance and extended transient thermoplastic range is made by the method including the steps of mixing ethyl silicon trihalide and phenyl silicon trihalide, said ethyl silicon trihalide being present in the amount of at least 10 mol percent and less than 30 mol percent of the total mixture, hydrolyzing said mixture, and isolating a partially condensed cohydrolyzate of said phenyl silicon trihalide and said ethyl silicon trihalide.

The phenyl silicon trihalide compound, as used in the present invention, may be any one of the several phenyl silicon trihalides but is preferably a phenyl silicon trichloride, since this compound is somewhat more economically produced than the other halides, particularly the phenyl silicon tribromide or triiodide, and is more amenable to hydrolysis than the phenyl silicon trifluoride. Similarly, ethyl silicon trichloride is the preferred compound of the ethyl silicon trihalide group to be combined with the preferred phenyl silicon trichloride in order ultimately to produce the desired cohydrolyzate. As noted above, the ethyl silicon trihalide, preferably the ethyl silicon trichloride, is mixed with the preferred phenyl silicon trichloride to the extent of at least 10 mol per cent and not more than 30 mol per cent of the total mixture. It has been found that particularly desirable results may be had when the ethyl silicon trichloride is present in the mixture to the extent of 15–25 mol per cent and a preferred composition, which has been found to be especially suitable, is a combination of 80 mol percent of phenyl silicon trichloride with 20 mol percent of ethyl silicon trichloride.

That the advantageous properties of the composition of the present invention are not dependent upon the manner of hydrolysis is apparent from the widely different conditions of hydrolysis which may be employed without affecting the improved properties of the ultimate composition. Thus, isopropyl ether may be employed in a ratio of 2 volumes of ether to 1 volume of halide mixture as a solvent for the mixed halides, and this solution added to a mixture of ice and water maintained at any temperature from 0° C. to 40° C., but preferably below 10° C., and suitably maintain this temperature for a time to permit the complete hydrolysis of the halides. When the hydrolysis is carried on in this manner, it has been found that substantially no undesired condensation of the hydrolyzed materials occurs and that a solution of cohydrolyzate in isopropyl ether separates and may subsequently be recovered from the water layer. This solution is susceptible to treatment for recovery of the partially condensed cohydrolyzate materials, whereby ultimately molding powders of desirably extended thermoplastic range may be had.

Many variations of this procedure are possible. For example, when employing the above-mentioned isopropyl ether, it appears to make little difference whether the ether or the mixed halides predominate in the solution. Thus, ratios of from 1 volume of ether to 1 volume of mixed halides to 3 volumes of ether to 1 volume of mixed halides have been employed. Moreover, it has been found, as noted, that temperatures may rise well above the 10° C. mentioned as the top of the preferred range without substantial loss of ultimate extended thermoplastic range, temperatures as high as 40° C. having been encountered in the course of hydrolysis on a semi-commercial basis without destroying the ultimate properties of the material.

The solvent employed need not be limited to isopropyl ether as other ethers, such as ethyl ether, and other organic solvents of standard use in commerce, such as ketones, and the like may be employed. Thus, acetone, dioxane, methyl ethyl ketone, cyclohexanone, and materials of hydrocarbon nature, such as toluene, have been used. These materials may suitably be employed in volumes ranging from 3 volumes of solvent to 1 volume of halides to 1 volume of solvent to 1 volume of halides, and may, similarly to isopropyl ether, be employed with hydrolysis temperatures ranging from the ice and water temperature up to about 40° C.

In addition, if desired, the hydrolysis may be conducted from a mixture of halides which are not dissolved in any solvent whatsoever but which are simply added to a hydrolysis mass comprising a mixture of ice and water, which suitably may have added thereto various agents which serve ultimately as solvents for the hydrolyzed material. Such solvents for the hydrolyzed material may be present at the time of adding the mixed halides to the hydrolysis agent, or the solvent may be added subsequent to completion of hydrolysis. Also, if desired, various agents may be employed for slowing the speed of hydrolysis. Thus, mixtures of methanol and water have been employed with no substantial modification of the ultimate product.

Finally, a further variation of the hydrolysis procedure has been to add the mixed halides to a tertiary alcohol in the absence of water. In such case, the mixed hydrolyzate, being soluble in the tertiary chloride formed in the reaction, may be recovered free of the tertiary chloride by distillation of the same from the hydrolysis mass or by other means which will be apparent to those skilled in the art.

Such variant conditions during the hydrolysis step are found to have substantially no effect upon the properties of the final product, particularly the property of extended thermoplastic range which enables the preparation of molding powders and the subsequent preparation of filled materials of thermosetting properties. It will be appreciated that this ease of hydrolysis and very broad adjustability of hydrolysis conditions is a substantial advantage in the commercial production of the molded materials of the present invention, as well as of the cohydrolyzate under discussion herein.

The cohydrolyzate of the present invention may be used along in solid comminuted form or in conjunction with inert filler materials to produce suitable molding compositions. As the fillers are not believed to enter into chemical combination with the siloxane, no limitation, other than inertness and heat resistance, need be placed thereon. For example, the cohydrolyzate in solid comminuted form may be used in conjunction with such materials as mineral salts, such as barium sulfate, fibrous minerals, such as serpentine or asbestos, refractory oxides, such as alkaline earth oxides, magnesium oxide, titanium, zirconium and other similar oxides, carbon black, certain of the mineral sulfides, such as antimony trisulfide, glass wool or powder, artificial minerals, such as rock wool, refractory silicates and mixed silicates, pigments, talc, mica, and the like.

The cohydrolyzates of the present invention may be "cured" by heating to relatively elevated temperatures, in general, above the boiling point of water, the preferred temperature being above 200° C., a particularly advantageous range having been found to be between 265° and 275° C. Understandably, the "cure" must take place below the temperature at which substantial decomposition of the siloxane material takes place and hence, "curing" temperatures in general are below 400° C. for unfilled resins. Molded articles may also be "cured" at the same temperatures and particularly in the case of filled molded articles, ultimate heat resistance to temperatures far in excess of 400° C. has been observed.

The time required to "cure," i. e., substantially completely to condense the cohydrolyzates of the present invention, varies with conditions of the "cure." Where a given temperature of "cure" is chosen, it has been found advantageous periodically to determine the hardness of the siloxane material during the progress of the condensation reaction at the temperature at which the "cure" is carried out. This method of determining the time rate of "cure" may be referred to as the "hot hardness" test. When the "hot hardness" test results show a substantially constant value at the "cure" temperature, it may be presumed that the cohydrolyzates have been substantially completely condensed. By such procedure, the time rate of the condensation reaction may be determined under given conditions and this data applied to the same or similar compositions subsequently to be treated.

The time required to bring the cohydrolyzates of the present invention to a constant "hot hardness" varies with the method of heating. A very rapid rate of "cure," as measured by the constant "hot hardness" test, may be obtained in a few minutes by dielectric heating. However, this type of heating presently appears to be best suited to cohydrolyzates of the present invention which have been mixed with a filler material, the dielectric constant of the unfilled cohydrolyzates being sufficiently high to preclude the obtaining of a satisfactory rate of condensation. Satisfactory rates of condensation for the unfilled cohydrolyzates may be obtained by heating with general purpose sources of infra-red radiations. The rate of "cure" of the unfilled cohydrolyzates, effected by such infra-red radiations, may be further accelerated by mixing with the cohydrolyzates, prior to subjecting them to molding pressures and temperatures, minor amounts of "curing" catalysts, of which certain heavy metal and alkali metal naphthenates, such as lead and lithium naphthenates, may be cited as examples. "Curing" may also be effected on filled or unfilled molded materials by heating in an oven for periods of the order of 10 to 20 hours at the above-mentioned temperatures.

In order that those skilled in the art may better understand the method of the present invention, the following examples are offered:

EXAMPLE I

Part A

Phenyl silicon trichloride is prepared by the Grignard route by reacting bromobenzene with magnesium in ether and thereafter reacting the phenyl magnesium bromide thus formed with silicon tetrachloride to form a mixture of phenyl silicon chlorides. The phenyl silicon trichloride is separated from the reaction products by distillation after removal of the ether and silicon tetrachloride. The fraction boiling between 145° and 155° C. at 200 mm. Hg pressure, most of which boils at 147° C., is taken as the phenyl silicon trichloride fraction. Substantially the same procedure is followed to produce ethyl silicon trichloride, i. e., after the mixture of ethyl silicon chlorides has been separated from the ether and silicon tetrachloride, the fraction boiling between 99° and 101° C. at atmospheric pressure is taken as the ethyl silicon trichloride fraction. Eight mols of phenyl silicon trichloride are thoroughly mixed with 2 mols of ethyl silicon trichloride in isopropyl ether solution, using about 2 volumes of ether per volume of organo-silicon halides. The ether solution of the mixed organo-silicon halides is then added to a mixture of ice and water, which is kept constantly agitated during the addition. After all of the solution of the organo-silicon chlorides has been added, the hydrolysis mass is agitated vigorously for about 10 minutes, following which an ether solution of the hydrolyzate of phenyl silicon trichloride and ethyl silicon trichloride mixture is allowed to separate therefrom. The aqueous layer is withdrawn from contact with the ether solution of the hydrolyzate and discarded. The ether solution of the hydrolyzate is next placed in a suitable container fitted with a vapor take-off leading to a water-cooled condenser, which in turn is attached to a receiver; the containing flask is externally heated with steam until substantially all of the ether has been removed. The removal of the ether by distillation in this manner promotes the condensation of the hydrolyzate but only to a limited extent. Water formed by virtue of the progress of the condensation reaction is removed along with the distilling ether.

Part B

The resin still containing some solvent from Part A above is next combined with an amount of lead naphthenate (condensation catalyst) equal to 1% of the weight of the siloxane resin, and subsequently further heated in order to remove the remainder of the solvent and to cause further condensation of the cohydrolyzate. After substantially all of the solvent has been removed, the cohydrolyzate is obtained in a solid form. This solid mass is next comminuted to a fine powder. A hammer mill is a suitable means of comminuting this material at this stage in its preparation.

Part C

As an example of obtaining the unfilled "cured" resin, the following may be cited: Thirty grams of the comminuted hydrolyzate obtained from Part B above is placed in a small (2″) disc mold and the mold placed between the heated platens (320° F.) of a hydraulic press and pressure molded (6000 p. s. i.) for 30 minutes, after which time the pressure on the mold is released, and coolant circulated through the press platens. After the temperature of the mold reaches about 35–40° C., it is removed from the press, and the molded disc in turn removed from the mold. The molded disc is a hard, amber, semi-transparent to translucent material; in order substantially to complete the condensation of the resin, the disc is "cured" @ 273° C. for 16 hours.

Part D

As an example of a filled material in which the binder is the composition of this invention, the following may be cited: The comminuetd hydrolyzate powder from Part B above is combined with 37½ parts of barium sulfate and 37½ parts of asbestos; to this dry mass is added sufficient acetone substantially to moisten the mix. The wetted ingredients are mixed in a steam-heated Baker-Perkins mixing mill for 20 minutes, during which time most of the solvent evaporates. Further gentle heating @ 100° C. for 10 minutes removes the remainder of the acetone. The mixture is next placed in a suitable mold and subjected to a pressure of 6000 lbs. per square inch at a temperature of 320° F. for a period of 30 minutes, in a hydraulic press, after which time the mold is removed from the hydraulic press and the molded article removed from the mold. The molding is further heated @ 525° F. for 16 hours until the hardness at this temperature remains substantially constant, when measured with a specially adapted Rockwell hardness instrument.

EXAMPLE II

Phenyl silicon trichloride and ethyl silicon trichloride, prepared in accordance with Example I, Part A, above, are combined in a ratio of 9 mols of phenyl silicon trichloride to 1 mol of ethyl silicon trichloride and are dissolved in 3 volumes of isopropyl ether. This mixture is added gradually to a mixture of ice and water maintained at a temperature below 10° C., which ice and water mixture is kept constantly agitated during the addition of the solution of chlorides thereto. The hydrolysis mass is maintained in agitated condition for about 10 minutes subsequent to completion of addition, following which the ether solution of cohydrolyzate is permitted to separate from the water. The cohydroylzate is worked up in the manner of Example I, Part A. Upon the removal of all of the solvent, the remaining cohydrolyzate is placed in a closed container with 1% triethanolamine and subjected to 100° C. temperature under a vacuum of 20–25 in. (80–100 mm. pressure) for a period of 4 hours, during which time the cohydrolyzate foams rapidly to form a hard, spongy mass of a volume many times that of the original cohydrolyzate in the container. At the end of the heating period, the material is ground to a fine powder, which may be worked up in the manner of Example I, Parts C and D, if desired. The "cure" time of the material obtained, when worked up in accordance with Example I, Part C, is approximately 15 hours.

EXAMPLE III 7 mols of phenyl silicon trichloride and 3 mols of ethyl silicon trichloride, prepared in accordance with Example I, Part A, are combined in the ratio of 1 volume of mixed chlorides to 1 volume of isopropyl ether, and the procedure of Example II above followed thereafter. A molding powder is obtained which has substantially the property of the material described in Example I, Parts C and D.

EXAMPLE IV 8 mols of phenyl silicon trichloride and 2 mols of ethyl silicon trichloride, prepared in accordance with Example I, Part A, are combined with acetone in the ratio of 1 volume of mixed chlorides to 1 volume of acetone. Hydrolysis is carried out by adding the mixed chlorides to a mixture of ice and water. During the hydrolysis, the temperature is found to rise to about 40° C., at which point sufficient ice is added to prevent the temperature from going above that point. The hydrolysis mass is agitated for about 15 minutes, after which it is worked up in the manner of Example II, a molding powder being obtained which is equivalent in all respects to that obtained in any of the examples above.

EXAMPLE V 7.5 mols of phenyl silicon trichloride and 2.5 mols of ethyl silicon trichloride are combined with 1,4-dioxane in a ratio of 1 volume of mixed chlorides to 1 volume of dioxane. The mixture is poured into a mixture of ice and water maintained at a temperature of approximately 15° C. and after agitation for a period of about 10 minutes, is worked up in accordance with the method described in Example II above. The molding powder recovered in accordance with this hydrolysis method and worked up is found to be substantially equivalent in all respects to those described above.

EXAMPLE VI 8 mols of phenyl silicon trichloride are combined with 2 mols of ethyl silicon trichloride and 1 volume of this mixture is combined with 1 volume of methyl ethyl ketone, after which the mixed ketone and chlorides are added gradually to a mixture of ice and water, the temperature of the mixture being observed to rise as high as 40° C. over a period of about 10 minutes of agitation. At the end of this time, the solvent is removed and the cohydrolyzate worked up in accordance with previous examples, the material being found to be equivalent in all respects to the materials obtained in accordance with the other examples.

EXAMPLE VII 200 grams of a mixture of 80 mol per cent of phenyl silicon trichloride and 20 mol per cent of ethyl silicon trichloride are dissolved in 77 cc. of toluol. This mixture is added with efficient agitation to a mixture of 161 cc. of tertiary amyl alcohol, 666 cc. of water, and 77 cc. of toluol, the mass being maintained at a temperature of approximately 25° C. for a period of 10 minutes, after which the hydrolysis is deemed to be complete. The material is worked up by removing the toluol by distillation and subsequently by separating a tertiary amyl alcohol solution of the hydrolyzate. Subsequent steps of recovery and the like are as noted above, the material obtained being substantially equivalent as to that obtained in Example II.

EXAMPLE VIII

A mixture of 200 grams of combined silicon trichlorides comprising 80 mol per cent of phenyl silicon trichloride and 20 mol per cent of ethyl silicon trichloride is added to a combination of 400 cc. of methanol, 1100 cc. of water, and 100 cc. of Solvesso No. 2 (toluol), the mixture being maintained under agitation at 10° C. for a period of 20 minutes. Subsequent to this period of agitation, the resin is recovered in the Solvesso solution and worked up in the manner of Example II.

EXAMPLE IX 387 parts of tertiary butyl alcohol are placed in a 3-neck flask fitted with a mechanical stirrer, water-cooled reflux condenser, and dropping funnel. A mixture of 137.5 gms. of phenyl silicon trichloride and 71 gms. of phenyl-ethyl silicon dichloride is placed in the dropping funnel. The organo-silicon chloride mixture is slowly added to the tertiary butyl alcohol while the latter is being heated gently and agitated. Once the reaction has started, as noted, a distinct rise in the temperature of the reactants in the flask takes place and further addition of the organo-silicon chloride mixture is so controlled that a slow reflux is maintained at the condenser. The organo-silicon chloride mixture is added over about 30 minutes. After the contents of the flask have been transferred to a distillation apparatus, most of the tertiary butyl alcohol and the excess tertiary butyl chloride are distilled from the reaction mass. A clear, light-brown solution remains as a residue after the distillation. This solution is further concentrated by pouring into an open pan and heating the pan and contents at 140° C. for 16 hours. A clear, brown, fluid material remains after the heat treatment, which solidifies upon cooling to a smooth, tough, pliable resin which does not craze or crack.

In the table below, results of high temperature treatment of some molded siloxanes are given. The individual silicon trichlorides are prepared in the manner of Example I, Part A, above; all materials are hydrolyzed at 0° C. by adding 2:1 isopropyl ether solutions thereof to ice and water mixtures. A molding is made from each hydrolyzate designated by applying heat and pressure thereto in the presence of 1% of triethanolamine as a condensation catalyst, but without added filler material, and with further application of heat to "cure" the molded masses. The "cure" is deemed to be substantially complete when the hardness of a molded article becomes constant at the temperatures of the "curing" step hereinabove referred to as constant "hot hardness."

|  | Proportions, Mol Percent | Decomposition (percent Of Theoretical) at 425° C. for 2 Hours |
|---|---|---|
| Hydrolyzate Of: |  |  |
| $CH_3SiCl_3$ | 100 | 97 |
| $C_2H_5SiCl_3$ | 100 | 96 |
| $C_6H_5SiCl_3$ | 100 | 15 |
| Cohydrolyzate Of: |  |  |
| $C_6H_5SiCl_3$ | 80 | } 73 |
| $CH_3SiCl_3$ | 20 |  |
| $C_6H_5SiCl_3$ | 44 | } 26.1 |
| $CH_3SiCl_3$ | 56 |  |
| $C_6H_5SiCl_3$ | 80 | } 12.6 |
| $C_2H_5SiCl_3$ | 20 |  |

The expression "Percent of Theoretical" in the table above has reference to the percentage of the carbon which is decomposed during the time of heating.

In addition to thermal stability and extended transient thermoplastic range, the cohydrolyzates of the present invention enjoy certain advantages in the method of their preparation which render them more suitable, commercially, for the manufacture of moldable compositions, than any of the prior art compositions or than hydrolyzates of phenyl silicon trihalides and ethyl silicon trihalides which have been combined in the same proportions as disclosed herein, but only subsequent to individual hydrolysis. For example, when a solution of a phenyl silicon trihalide, such as phenyl silicon trichloride, is hydrolyzed by adding such solution to water with agitation, the solution of the hydrolyzate obtained may become curdled if the temperature of the hydrolysis mass is allowed to rise much above 10° C. Likewise, if the concentration of phenyl silicon trichloride in solution (prior to hydrolysis) is excessive, the temperature of the hydrolysis mass becomes difficult to control and the curdled condition of the hydrolyzate may appear. The curdled condition of the hydrolyzate is indicative of relative insolubility in the solvent, which in turn is indicative of the relative degree to which condensation and cross-linking of the molecules of the hydrolyzate has taken place. Substantially the same situation obtains when a solution of an ethyl silicon trihalide, such as ethyl silicon trichloride, is hydrolyzed in water. However, this difficulty of necessity for careful temperature control is obviated when a solution of a mixture of a phenyl silicon trihalide with an ethyl silicon trihalide (70–90 mol per cent of phenyl silicon trihalide) is hydrolyzed in water. As the examples show, the hydrolyzates of these mixtures appear to co-act in such a manner as to retard the rate of the condensation reaction to a point where control of the temperature of the hydrolysis mass is of much less consequence in obtaining a moldable, thermally stable, siloxane composition.

Moreover, it may be noted that very definite increased thermal stability is obtained from the compositions of the present invention when compared with mixtures of hydrolyzates of phenyl silicon trichloride and the methyl silicon chloride analogues, which mixtures, in addition, are subject to undesirably extended heating periods at high temperatures in order to effect a substantially complete "cure" thereof.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A moldable, siloxane-containing composition of superior heat resistance and of extended transient thermoplastic range containing as the siloxane portion thereof a partially condensed cohydrolyzate of a mixture of a phenyl silicon trihalide with an ethyl silicon trihalide, said ethyl silicon trihalide being present in an amount between 10 mol per cent and 30 mol per cent of the total of said silicon halides, said cohydrolyzate being characterized by the property, when cured, of possessing a much greater heat stability than that of a hydrolyzate of ethyl silicon trihalide alone and an appreciably greater heat stability than that of phenyl silicon trihalide alone when all three are prepared in an otherwise identical manner and when all three are subjected to a temperature of 425° C. for 2 hours.

2. A moldable, comminuted, siloxane-containing composition of superior heat resistance and extended transient thermoplastic range in which a partially condensed cohydrolyzate of a mixture of about 80 mol per cent of phenyl silicon trichloride with about 20 mol per cent of ethyl silicon trichloride is the siloxane portion of said composition, said cohydrolyzate being characterized by the property, when cured, of possessing a much greater heat stability than that of a hydrolyzate of ethyl silicon trichloride alone and an appreciably greater heat stability than that of phenyl silicon trichloride alone when all three are prepared in an otherwise identical manner and when all three are subjected to a temperature of 425° C. for 2 hours.

3. A moldable, siloxane-containing composition of superior heat resistance and extended transient thermoplastic range containing as the siloxane portion thereof a partially condensed cohydrolyzate of a mixture of phenyl silicon trichloride with ethyl silicon trichloride, said ethyl silicon trichloride being present in an amount between 10 mol per cent and 30 mol per cent of the total of said silicon chlorides, and in which the non-siloxane containing portion of said composition is chemically inert to said siloxane portion thereof, said cohydrolyzate being characterized by the property, when cured, of possessing a much greater heat stability than that of a hydrolyzate of ethyl silicon trichloride alone and an appreciably greater heat stability than that of phenyl silicon trichloride alone when all three are prepared in an otherwise identical manner and when all three are subjected to a temperature of 425° C. for 2 hours.

4. A moldable, comminuted, siloxane-containing composition of extended transient thermoplastic range in which the siloxane portion of the composition comprises essentially a partially condensed cohydrolyzate of a mixture of about 80 mol per cent of phenyl silicon trichloride with about 20 mol per cent of ethyl silicon trichloride, and the non-siloxane portion of said composition is chemically inert to said siloxane portion, said cohydrolyzate being characterized by the property, when cured, of possessing a much greater heat stability than that of a hydrolyzate of ethyl silicon trichloride alone and an appreciably greater heat stability than that of phenyl silicon trichloride alone when all three are prepared in an otherwise identical manner and when all three are subjected to a temperature of 425° C. for 2 hours.

5. The method of completing the condensation of a cohydrolyzate of a mixture of a phenyl silicon trihalide with an ethyl silicon trihalide, said ethyl silicon trihalide being present in an amount between 10 mol per cent and 30 mol per cent of said mixture and said phenyl silicon trihalide and said ethyl silicon trihalide making substantially 100% of said cohydrolyzate, which includes the step of heating said cohydrolyzate at a temperature within the range of 100° to 400° C. until the hardness of said cohydrolyzate at the temperature of heating is substantially constant, said cohydrolyzate being characterized by the property, when cured, of possessing a much greater heat stability than that of a hydrolyzate of ethyl silicon trihalide alone and an appreciably greater heat stability than that of phenyl silicon trihalide alone when all three are prepared in an otherwise identical manner and when all three are subjected to a temperature of 425° C. for 2 hours.

6. The method of claim 5 in which the cohydrolyzate is derived from a mixture of phenyl and ethyl silicon trichlorides, said ethyl silicon trichloride amounting to about 20 mol per cent of the total of the mixture of said silicon chlorides.

7. The method of claim 6 in which the cohydrolyzate is heated at a temperature within the range of 200° to 400° C.

References Cited in the file of this patent

UNITED STATES PATENTS

| | | |
|---|---|---|
| 2,386,466 | Hyde | Oct. 9, 1945 |
| 2,437,204 | McGregor et al. | Mar. 2, 1948 |
| 2,450,594 | Hyde | Oct. 9, 1948 |
| 2,460,799 | Barry | Feb. 8, 1949 |
| 2,486,162 | Hyde | Oct. 25, 1949 |
| 2,553,362 | Dannenberg | May 15, 1951 |
| 2,620,317 | Johannson et al. | Dec. 2, 1952 |

FOREIGN PATENTS

| | | |
|---|---|---|
| 561,226 | Great Britain | May 10, 1944 |
| 573,960 | Great Britain | Dec. 14, 1945 |